Patented June 3, 1930

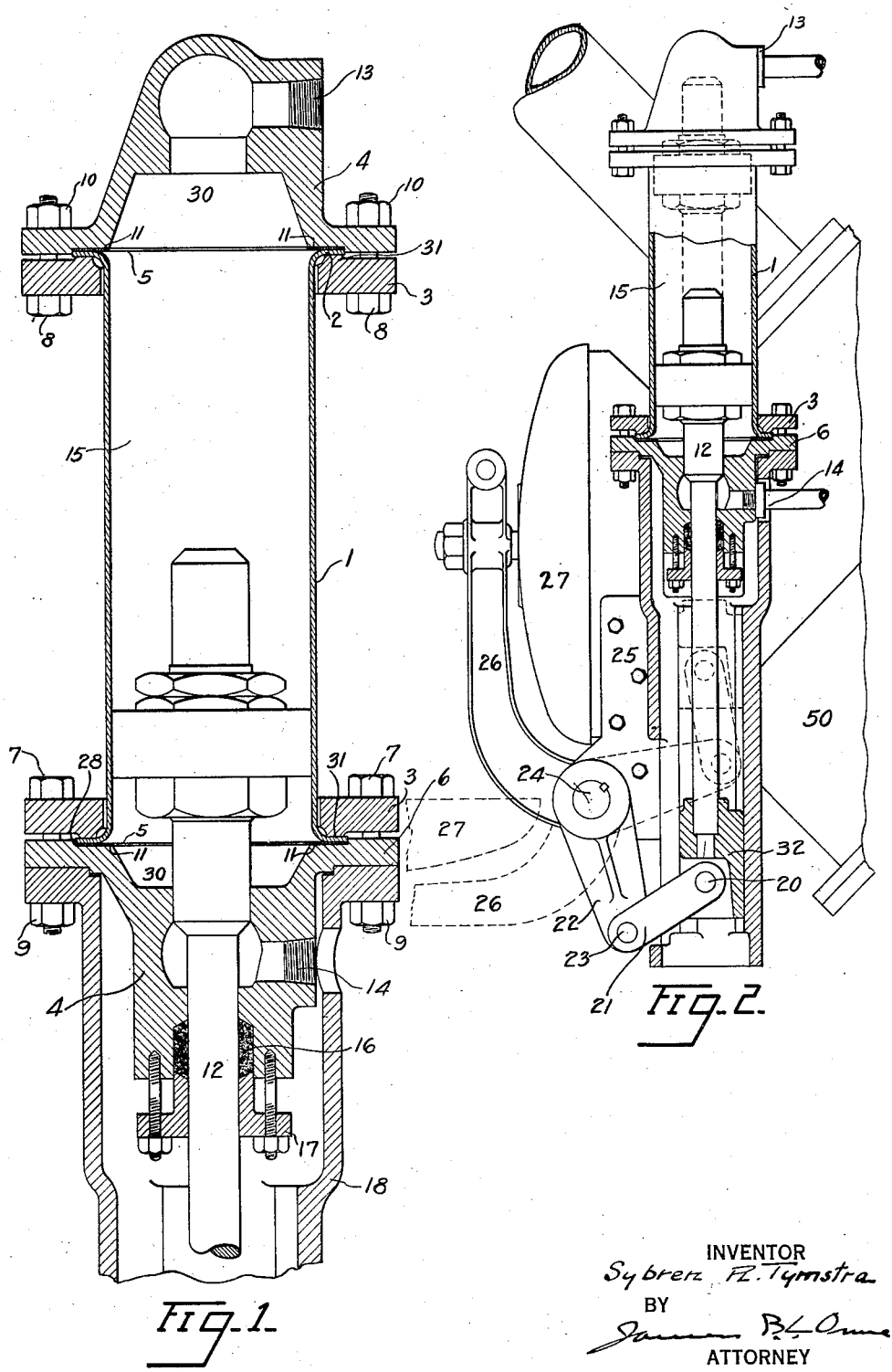

1,761,600

UNITED STATES PATENT OFFICE

SYBREN R. TYMSTRA, OF FLUSHING, NEW YORK, ASSIGNOR TO SEMET-SOLVAY ENGINEERING CORPORATION, OF NEW YORK, N. Y., A CORPORATION OF NEW YORK

CYLINDER AND MECHANISM OPERATED THEREBY

Application filed May 5, 1927. Serial No. 188,996.

This invention relates to a cylinder construction and particularly to a hydraulic cylinder or motor and the mechanism operated thereby. The invention will be described hereinafter in connection with hydraulic cylinders used on the charging machines of gas generators, but it will be evident that it is applicable to other cylinder constructions as for example in reciprocatory pumps and the like.

In hydraulic cylinders or motors as they have been heretofore constructed, in order to withstand the stresses and strains incident to normal operation, to provide a smooth bearing surface for the reciprocating piston and a fluid tight closure capable of withstanding and preventing the escape of the pressure fluid, it has been necessary to use an outer shell of cast iron and an inner brass liner, the outer shell having flanges which are suitably fastened to the heads forming closures for the cylinder. To properly assemble the shell, liner and heads, it is necessary to first machine the inner surface of the shell and the flanges, then force the brass liner into the shell and thereafter machine the inner surface of the liner to insure a smooth surface and a tight engagement between the liner and shell, then machine the head and thereafter fasten the head and flange by bolts or other suitable clamps to form the cylinder. This, of course, is an expensive and tedious operation and consequently greatly increases the initial cost of the cylinder.

In order to provide a positive and dependable driving connection between the piston rod and the cover or other object to be moved, it has been found necessary to fasten a rack or bar on brackets at each end of the rod. Links or levers are fastened to the rack and are in operative connection with the driven object. This structure requires a piston rod of considerably length, thus materially increasing the space occupied by the machine.

An object of my present invention is to provide a hydraulic cylinder and operative connections thereto that are simple in construction and efficient in operation.

The invention accordingly comprises a cylinder including a shell having flanged ends, heads for the shell and means for clamping the heads to the flanges to provide a closure for the ends of said shell.

In my invention, a brass shell is turned or rolled over at the ends to form flanges, rings are loosely mounted on the shell and the heads of the cylinder are fastened by bolts and nuts to said rings to clamp the flanges therebetween, thus providing a fluid tight closure. Brass is preferably used as it requires substantially no machining and possesses the property of withstanding the stresses and strains incident to operation. A piston rod reciprocates within the cylinder and directly fastened to this rod is a lever which is pivotally connected to a second lever fastened on a rock shaft. The rock shaft is in operative engagement with an arm fastened to the cover or other object to be moved.

Other objects and advantages will appear from the following detailed description taken in connection with the accompanying drawings in which Fig. 1 is a vertical section through a hydraulic cylinder or motor showing the piston and rod in elevation and illustrating an embodiment of the invention; and Fig. 2 is an elevation partly in section of a hydraulic cylinder or motor and the mechanism operated thereby showing the hydraulic cylinder mounted on the magazine of a charging device and arranged to open and close the cover of this magazine.

In the preferred embodiment of the invention illustrated in Figs. 1 and 2, 1 indicates a shell, preferably of brass or other suitable material, the ends of which are turned or bent to provide the flanges 2, 2. The heads 4—4 of the hydraulic cylinder or motor are provided with bolt holes and a recessed or cut away portion 11 disposed concentrically with the openings 30 in said head and of sufficient width to confine the flanges 2—2. Rings 3, 3, having bolt holes in alignment with the holes in the head and an annular projecting surface 31 are loosely mounted on the shell 1 prior to the forming of the flanges. Bolts 7, 8 pass through the aligned bolt holes of the heads and rings and by turning the nuts 9, 10 on the bolts, the flanges are firmly clamped between the rings and heads, the annular projection 31 of each ring forcing the flange into the recess 11 forming a fluid proof closure. Gaskets 5, 5 are preferably placed in the annular recess 11 of each head.

The piston rod 12 is reciprocated within the shell by the admission and discharge of a suitable pressure fluid through the ports 13, 14 into the cylinder indicated generally by the reference number 15. The head 6 is provided with the usual packing 16 held adjustably in position by gland 17 within the casing or supporting guide 18. This casing is fastened by nuts 9 and bolts 7 to the head 6 and is of sufficient length to enclose the piston when in extended position as shown in full lines Fig. 2.

The piston rod 12 is fastened to the cross head 32 which slides in the casing or supporting guide 18. Pivotally connected to the cross head 32 at 20 is the link 21, the other end of which is pivotally joined to the lever arm 22 forming the toggle indicated by the reference numeral 23. Lever arm 22 is keyed to rock shaft 24 carried by bearing brackets 25 on the magazine 50. An arm 26 is operatively fastened to the cover 27 of the magazine and to the shaft 24 so that when the shaft 24 is rocked by the reciprocation of piston rod 12 through toggle 23, the cover is moved to the dotted line position shown in Fig. 2. Movement of the piston rod in the reverse direction closes the cover. It will be noted that the angular relation between the cross head 32, link 21 and lever 22, is such that a toggle action is produced which gradually increases the pressure exerted on the operating arm 26, reaching a maximum when the cover is in closed position, and this without increasing the fluid pressure in the hydraulic cylinder. It is understood that the arm 26 could be used to operate other devices than the cover and that the mechanism disclosed herein is not limited to a cover operating and closing device.

It will be noted that the hydraulic cylinder or motor disclosed herein is durable, simple in construction and efficient in operation. It requires substantially no machining; in practice it has been found desirable to machine only the outer periphery 28 of the flange to provide a smooth edge. This of course eliminates the expense of machining the interior of the cast iron shell, the lining and the flanges referred to above as the usual practice in the manufacture of hydraulic cylinders. By clamping the flanges of the shell between the rings and heads, the peripheries of which are in alignment, a tight, fluid-proof closure is formed which has been found highly efficient in operation. Further, the provision of the rock shaft in operative engagement with the cover or other article to be moved and connected by a toggle lever directly to the piston rod eliminates the cumbersome structure heretofore used and reduces the necessary overall space required for the machine.

The term "cylinder" as used in the specification and claims is not intended to be confined to members which are circular in transverse cross section but is intended to include other shaped members which may function in like manner, as for example, members which are elliptical or polygonal in transverse cross section.

It will of course be understood that while a specific embodiment of the invention has been shown and described, various changes in the details thereof may be made by those skilled in the art, and this invention is not to be limited to the structure disclosed, but only by the scope of the appended claims.

What is claimed is:

1. In a cylinder construction, in combination a shell having one end thereof formed with a flange which is constructed and arranged to provide a flat annular surface, a head for the shell arranged to contact with one side of said flat annular surface, a ring on said shell arranged to engage the other side of said flat annular surface and means for clamping the flange between said ring and said head so that substantially the entire flat annular surface of said flange engages and contacts with said head and thus forms a fluid tight closure for said shell.

2. A cylinder comprising a brass shell having flanged ends, heads for the shell each provided with a recessed portion concentric with the opening in said head, rings loosely mounted on the shell each having a projecting portion adapted to cooperate with the recessed portion of the head to clamp a flange therebetween, and bolts passing through aligned openings in the rings and flanges having nuts screw threaded thereon to clamp the flanges between said heads and rings.

In witness whereof I have hereunto set my hand.

SYBREN R. TYMSTRA.